(12) United States Patent
Tamiya et al.

(10) Patent No.: US 12,120,229 B2
(45) Date of Patent: Oct. 15, 2024

(54) ENCRYPTION SYSTEM, FUNCTION VALUE CALCULATION METHOD, AND PROGRAM

(71) Applicant: NEC Corporation, Tokyo (JP)

(72) Inventors: Hiroto Tamiya, Tokyo (JP); Toshiyuki Isshiki, Tokyo (JP); Batnyam Enkhtaivan, Tokyo (JP)

(73) Assignee: NEC CORPORATION, Tokyo (JP)

( * ) Notice: Subject to any disclaimer, the term of this patent is extended or adjusted under 35 U.S.C. 154(b) by 354 days.

(21) Appl. No.: 17/624,929

(22) PCT Filed: Jul. 17, 2019

(86) PCT No.: PCT/JP2019/027996
§ 371 (c)(1),
(2) Date: Jan. 5, 2022

(87) PCT Pub. No.: WO2021/009860
PCT Pub. Date: Jan. 21, 2021

(65) Prior Publication Data
US 2022/0286280 A1  Sep. 8, 2022

(51) Int. Cl.
*H04L 29/06* (2006.01)
*H04L 9/08* (2006.01)
*H04L 9/30* (2006.01)
*H04L 9/32* (2006.01)

(52) U.S. Cl.
CPC .......... *H04L 9/0869* (2013.01); *H04L 9/3073* (2013.01); *H04L 9/3247* (2013.01)

(58) Field of Classification Search
None
See application file for complete search history.

(56) References Cited

U.S. PATENT DOCUMENTS

2019/0222424 A1* 7/2019 Lindemann ........... H04L 9/0861

OTHER PUBLICATIONS

Shinji Yoshino et al., "Multi-input Functional Encryption with Input Control Using Intel SGX", Proceedings of SCIS 2019, Japan, Jun. 22-25, 2019, pp. 1-9 (Year: 2019).*

(Continued)

*Primary Examiner* — Andrew J Steinle

(57) ABSTRACT

Provided is an encryption system that suppresses a communication cost from a key issuing system to a user and controls input to a function in the unit of data. The encryption system includes an encrypting apparatus, a signature apparatus, and a security execution apparatus. The encrypting apparatus generates pseudo-random numbers different for respective pieces of data, and encrypts the generated pseudo-random numbers together with the pieces of data. The signature apparatus regenerates the pseudo-random numbers used by the encrypting apparatus for encrypting the respective pieces of data, and generates control information for certifying validity of the pieces of the data from the regenerated pseudo-random numbers. The security execution apparatus verifies the control information based on the pseudo-random numbers obtained by decrypting ciphertexts of the pieces of the data, and calculates a function value of data obtained by decrypting the ciphertexts when the verification of the control information is successful.

9 Claims, 9 Drawing Sheets

(56) References Cited

OTHER PUBLICATIONS

Ryuya Uda et al., "Voice Stream Authentication Method for IP Telephony", IPSJ Journal, Aug. 2006, vol. 47, No. 8, pp. 2535-2547 (Year: 2006).*
International Search Report for PCT Application No. PCT/JP2019/027996, mailed on Oct. 8, 2019.
English translation of Written opinion for PCT Application No. PCT/JP0219/027996, mailed on Oct. 8, 2019.
Kai-Min Chung et al., "Functional Encryption from(Small) Hardware Tokens", Cryotology ePrint Archive, Report 2015/153, pp. 1-13.
Ben A. Fisch et al., "Iron: Functional Encryption using Intel SGX.", Cryptology ePrint Archive, Report 2016/1071, pp. 1-37.
Shinji Yoshino et al., "Multi-Input Functional Encryption with Input Control Using Intel SGX", Proceedings of SCIS 2019, Japan, Jun. 22-25, 2019, pp. 1-9.
Ryuya Uda et al., "Voice Stream Authentication Method for IP Telephony", IPSJ Journal, Aug. 2006, vol. 47, No. 8, pp. 2535-2547.

* cited by examiner

ENCRYPTION SYSTEM, FUNCTION VALUE CALCULATION METHOD, AND PROGRAM

This application is a National Stage Entry of PCT/JP2019/027996 filed on Jul. 17, 2019, the contents of all of which are incorporated herein by reference, in their entirety.

BACKGROUND

Technical Field

The present invention relates to an encryption system, a function value calculation method, and a program.

Background Art

With the spread of smart devices and Internet of Things (IoT) devices, services utilizing a lifelog, health data, or the like have been attracting attention. These pieces of data contain much information regarding privacy, and thus from the perspective of privacy protection, techniques of analyzing data while being encrypted are required.

As one of the techniques of analyzing data while being encrypted, the notion of functional encryption is proposed. Functional encryption is an encryption method that enables decryption of only a function value of data from ciphertext. Specifically, a key issuing system creates a private key s_f according to a function f A decryptor can calculate f(x_1, x_2, ..., x_n) from the private key s_f created by the key issuing system and the ciphertext CT_1, CT_2, ..., CT_n of data x_1, x_2, ..., x_n. In this case, information related to x_1, x_2, ..., x_n is never leaked to the outside.

Functional encryption is an encryption method having an appealing function as described above. However, in the simulation-based security, impossibility of implementation of functional encryption for a general function has been reported. In order to avoid such impossibility of implementation, a functional encryption method using a secure execution environment has been proposed.

Here, the secure execution environment assumes an environment in which information related to intermediate results of an executed program is never leaked. In the functional encryption method using the secure execution environment, the decryptor is caused to decrypt a ciphertext in the secure execution environment and calculate a function. As a result, information related to data other than the function value is never leaked to the decryptor, and the decryptor can calculate the function value.

For example, NPL 1 proposes a functional encryption method using a stateless device of which execution environment is protected, referred to as a hardware token.

NPL 2 proposes a functional encryption method using a hardware-assisted memory encryption function (hereinafter referred to as a memory encryption function) that isolates codes of a specific application present in a memory and data.

NPL 3 proposes a multi-input functional encryption method capable of control in the unit of a user using a memory encryption function. In the method of NPL 3, a key issuing system delivers random numbers to respective users. The user encrypts pieces of data together with the delivered random number. The key issuing system transmits, to a decryptor, control information that is based on the random number delivered to the user. The decryptor attempts to calculate a function value by using inside the secure execution environment, as in NPL 2. In this case, control of input to the function in the unit of a user using the control information issued by the key issuing system and the random number in the ciphertext is performed in the secure execution environment, and only the function value of the function with an input of data created by the user permitted by the key issuing system can be obtained.

CITATION LIST

Non Patent Literature

[NPL 1] Kai-Min Chung, Jonathan Katz, Hong-Sheng Zhou, "Functional Encryption from (Small) Hardware Tokens.", Cryptology ePrint Archive, Report 2015/153.
[NPL 2] Ben A. Fisch, Dhinakaran Vinayagamurthy, Dan Boneh, Sergey Gorbunov, "Iron: Functional Encryption using Intel SGX.", Cryptology ePrint Archive, Report 2016/1071.
[NPL 3] Shinji Yoshino, Masayuki Tezuka, Kazumasa Shinagawa, Keisuke Tanaka, "Multi-Input Functional Encryption Capable of Controlling Input Using Intel SGX" in Symposium on Cryptography and Information Security 2019 (SCIS2019), 2019.

SUMMARY

Technical Problem

In order to further enhance security, introduction of control with granularity finer than the unit of a user is conceivable. For example, control in the unit of data, per month, per day, and per minute or the like, is conceivable. In such a case, if the method proposed in NPL 3 is simply extended, operations as follows are required.

At the time of encryption, random numbers as many as pieces of data encrypted by the user are delivered from the key issuing system to the user. The user encrypts the pieces of data together with the random numbers different for respective pieces of data to be encrypted. The key issuing system transmits, to the decryptor, control information that is based on the random numbers incorporated into the respective pieces of data by the user. The decryptor performs control of input to the function in the unit of data and calculation of the function value by using inside the secure execution environment with a method similar to that of NPL 3.

Here, according to the method, security is enhanced; however, the random numbers as many as pieces of data encrypted by the user need to be transmitted from the key issuing system to the user, and when fine control in the unit of data per minute, per second, or the like is performed, a problem of increase in a communication cost arises.

The present invention has a main example object to provide an encryption system, a function value calculation method, and a program that suppress a communication cost from a key issuing system to a user and that contribute to control of input to a function in the unit of data.

Solution to Problem

According to a first example aspect of the present invention there is provided an encryption system. The encryption system includes: an encrypting apparatus configured to generate pseudo-random numbers different for respective pieces of data, and encrypt the generated pseudo-random numbers together with the respective pieces of the data; a signature apparatus configured to regenerate pseudo-random numbers used by the encrypting apparatus for encrypting the respective pieces of the data, and generate control information for certifying validity of the respective pieces of the data from the regenerated pseudo-random numbers; and a security execution apparatus configured to verify the control information based on the pseudo-random numbers obtained by decrypting ciphertexts of the respective pieces of the data, and calculate a function value of the pieces of the data obtained by decrypting the ciphertexts when the verification of the control information is successful.

According to a second example aspect of the present invention there is provided a function value calculation method. The function value calculation method includes: generating pseudo-random numbers different for respective pieces of data, and encrypting the generated pseudo-random numbers together with the respective pieces of the data; regenerating pseudo-random numbers used by the encrypting apparatus for encrypting the respective pieces of the data, and generating control information for certifying validity of the respective pieces of the data from the regenerated pseudo-random numbers; and verifying the control information based on the pseudo-random numbers obtained by decrypting ciphertexts of the respective pieces of the data, and calculating a function value of the pieces of the data obtained by decrypting the ciphertexts when the verification of the control information is successful.

According to a third example aspect of the present invention there is provided a program for causing a computer to execute: generating pseudo-random numbers different for respective pieces of data, and encrypting the generated pseudo-random numbers together with the respective pieces of the data; regenerating pseudo-random numbers used by the encrypting apparatus for encrypting the respective pieces of the data, and generating control information for certifying validity of the respective pieces of the data from the regenerated pseudo-random numbers; and verifying the control information based on the pseudo-random numbers obtained by decrypting ciphertexts of the respective pieces of the data, and calculating a function value of the pieces of the data obtained by decrypting the ciphertexts when the verification of the control information is successful.

Advantageous Effects of Invention

According to the above example aspects of the present invention, an encryption system, a function value calculation method, and a program that suppress a communication cost from a key issuing system to a user and that contribute to control of input to a function in the unit of data are provided. Note that, according to the present invention, instead of or together with the above effects, other effects may be exerted.

DESCRIPTION OF THE EXAMPLE EMBODIMENTS

Figure 1:
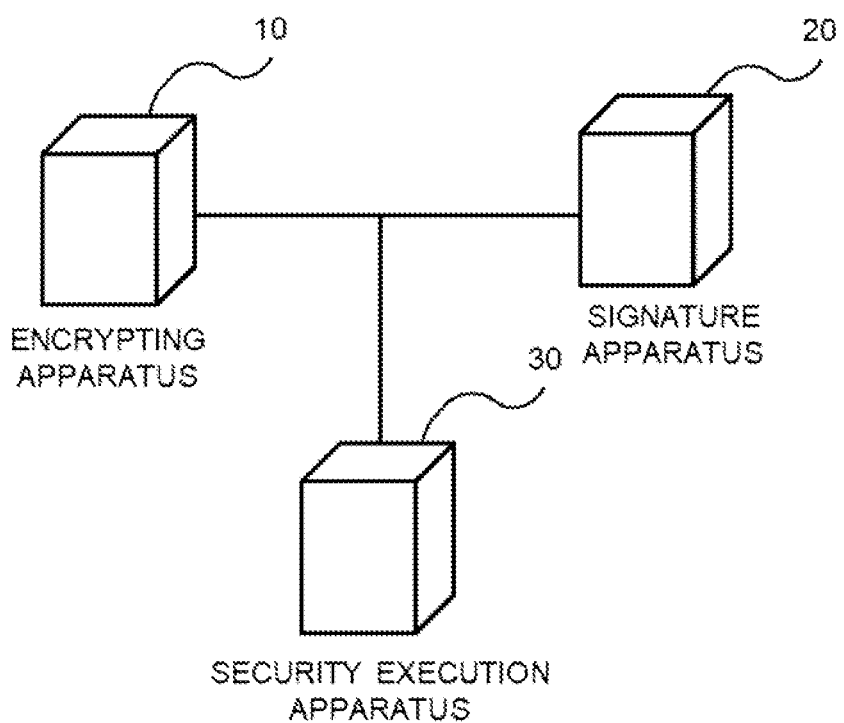
FIG. 1 is a diagram for describing an overview of an example embodiment.

First of all, an overview of an example embodiment will be described. Note that reference signs in the drawings provided in the overview are for the sake of convenience for each element as an example to promote better understanding, and description of the overview is not to impose any limitations. Note that, in the Specification and drawings, elements to which similar descriptions are applicable are denoted by the same reference signs, and overlapping descriptions may hence be omitted.

An encryption system according to an example embodiment includes an encrypting apparatus 10, a signature apparatus 20, and a security execution apparatus 30 (see FIG. 1). The encrypting apparatus 10 generates pseudo-random numbers different for respective pieces of data, and encrypts the generated pseudo-random numbers together with the respective pieces of the data. The signature apparatus 20 regenerates pseudo-random numbers used by the encrypting apparatus 10 for encrypting the respective pieces of data, and generates control information for certifying validity of the respective pieces of the data from the regenerated pseudo-random numbers. The security execution apparatus 30 verifies the control information based on the pseudo-random numbers obtained by decrypting ciphertexts of the pieces of data, and calculates a function value of the pieces of data obtained by decrypting the ciphertexts when the verification of the control information is successful.

In the encryption system illustrated in FIG. 1, a random number seed is delivered to a user (encrypting apparatus 10). The user creates the pseudo-random numbers by using the delivered random number seed, and encrypts the pseudo-random numbers together with the pieces of data. The signature apparatus 20 regenerates pseudo-random numbers encrypted together with the pieces of data by the user by using the random number seed delivered to the user, and creates control information by using the regenerated pseudo-random numbers. The security execution apparatus 30 decrypts the ciphertexts in a secure execution environment to obtain the pieces of data and the pseudo-random numbers, and verifies the control information by using the pseudo-random numbers. When the verification is successful, the security execution apparatus 30 calculates a function value with an input of the pieces of data obtained through the decryption.

In the encryption system, the user themselves generates the random numbers different for respective pieces of data used at the time of encryption based on the random number seed, and thus it is only necessary that a key issuing system (random number seed management apparatus) transmit only one random number seed to the user. As a result, a communication cost from the key issuing system to each user is limited to the one random number seed without depending on the number of pieces of data for the user registered with the database, and a communication cost from the key issuing system to each user can thereby be reduced low. In the encryption system, data is encrypted in the unit of data, and thus input to the function can also be controlled in the unit of data. In other words, according to the disclosure of the present application, a multi-input functional encryption system that is capable of controlling input to the function in the unit of data can be provided.

Specific example embodiments will be described below in further detail with reference to the drawings.

Detailed description on a public key encryption method, a signature method, a hash function, and a pseudo-random number generation method referred to in the system according to the disclosure of the present application will be omitted. Note that, from the perspective of security, it is desirable that a public key encryption method having indistinguishability against an adaptive chosen-ciphertext attack, a signature method having existential unforgeability against a chosen-plaintext attack, a hash function having collision resistance, a cryptographically secure pseudo random number generator, or the like be used.

For example, as the public key encryption method, use of a Rivest Shamir Adleman Optimal Asymmetric Encryption Padding (RSA-OAEP) or the like is conceivable. As the signature method, use of an Elliptic Curve Digital Signature Algorithm (ECDSA) signature or the like is conceivable. As the hash function, use of Secure Hash Algorithm-2 (SHA-2) or the like is conceivable. As the pseudo-random number generation method, a counter mode (CTR mode), a hash function, or the like according to Advanced Encryption Standard (AES) is conceivable.

It is only necessary that the security execution apparatus dealt with in the system according to the disclosure of the present application be an environment in which information in the apparatus in the middle of execution is assumed to be not leaked to the outside of the security execution apparatus. For example, as the security execution apparatus, the memory encryption function described above, a trusted execution environment (TEE), a hardware token, and an apparatus managed by a reliable third party are conceivable.

In the system according to the disclosure of the present application, a publicly known and unique user index (user identifier) is assigned to the user. The user index may be a number, or may be a character string.

In the system according to the disclosure of the present application, a decryption key deliver apparatus that delivers a decryption key to the security execution apparatus as with the case of NPL 2 and NPL 3 may be added. When the decryption key is delivered from the decryption key deliver apparatus to the security execution apparatus, it is desirable that verification of the decryption key distribution apparatus and the security execution apparatus be performed with the method as with the case of NPL 2 and NPL 3.

First Example Embodiment

Figure 2:
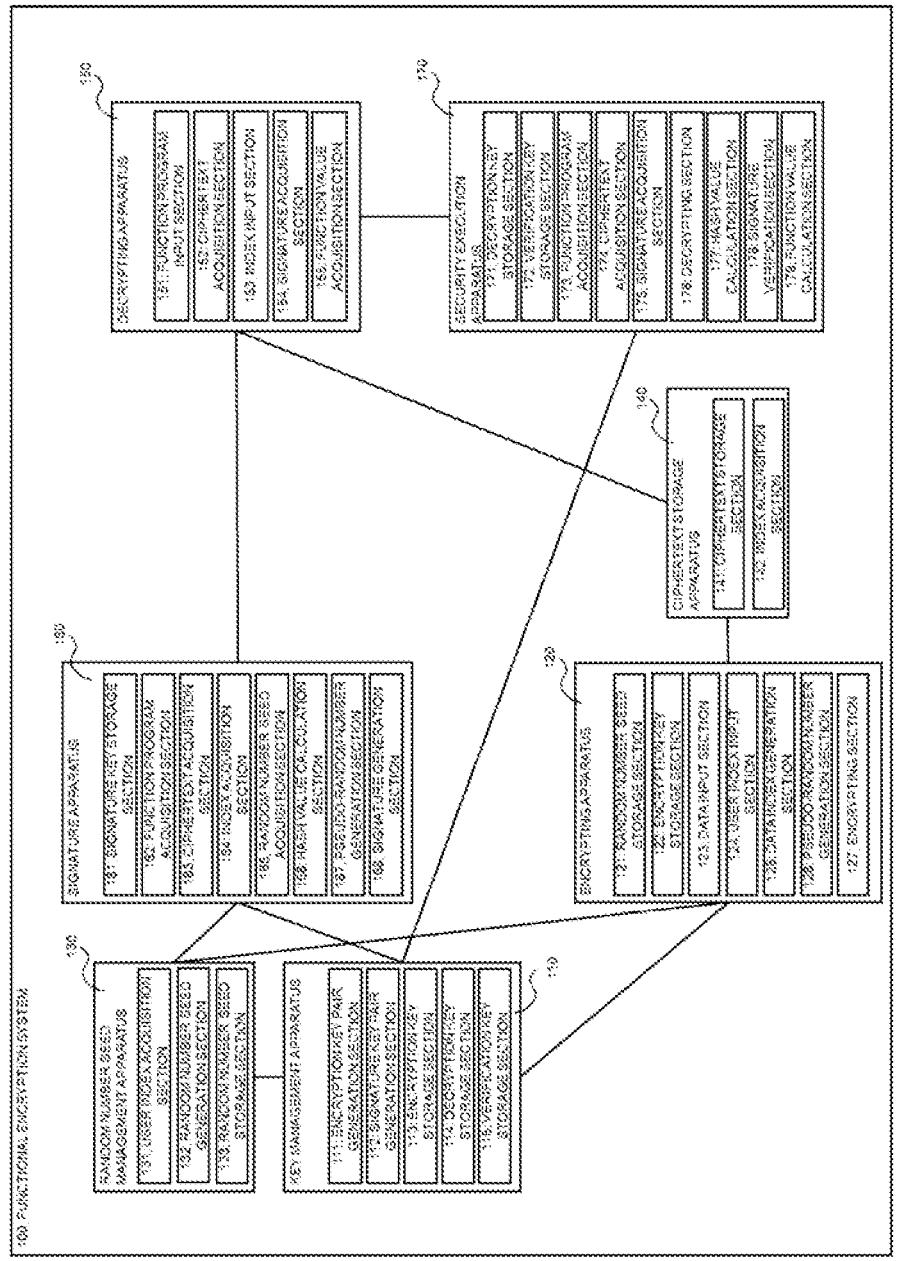
FIG. 2 is a block diagram illustrating an example of a configuration of a functional encryption system according to the first example embodiment.

A first example embodiment will be described in further detail with reference to the drawings.
[Description of Configuration]
FIG. 2 is a block diagram illustrating an example of a configuration of a functional encryption system 100 according to the first example embodiment. As illustrated in FIG. 2, the functional encryption system 100 includes a key management apparatus 110, an encrypting apparatus 120, a random number seed management apparatus 130, a ciphertext storage apparatus 140, a decrypting apparatus 150, a signature apparatus 160, and a security execution apparatus 170.

Figure 3:
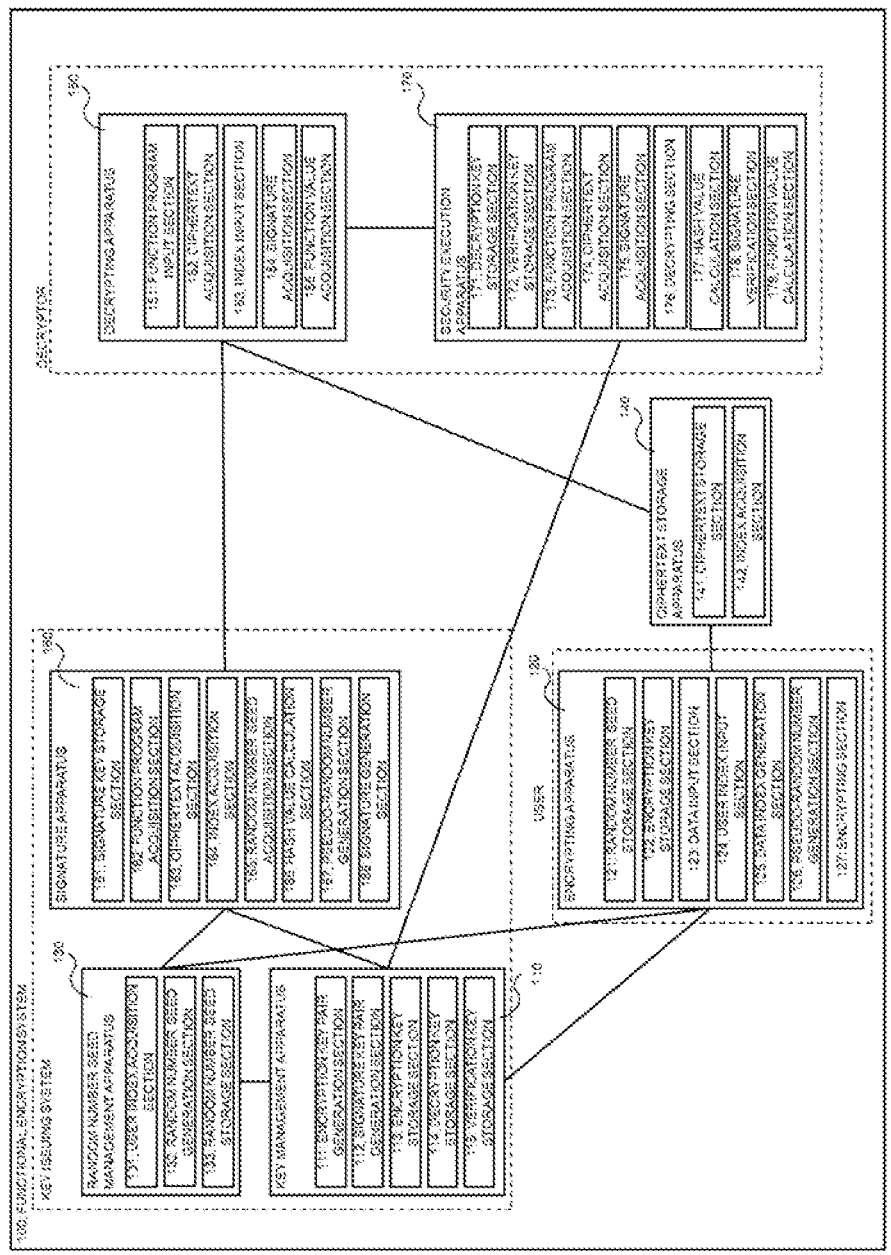
FIG. 3 is a block diagram illustrating an example of a configuration of the functional encryption system according to the first example embodiment.

With reference to FIG. 2 and FIG. 3, the key management apparatus 110, the random number seed management apparatus 130, and the signature apparatus 160 correspond to the key issuing system. The encrypting apparatus 120 corresponds to the user. The decrypting apparatus 150 and the security execution apparatus 170 correspond to a decryptor. The ciphertext storage apparatus 140 is a database that stores the ciphertexts created by the user.

As illustrated in FIG. 2, the key management apparatus 110 is connected to each of the encrypting apparatus 120, the random number seed management apparatus 130, the signature apparatus 160, and the security execution apparatus 170 via a predetermined communication path (for example, the Internet). The encrypting apparatus 120 is connected to the random number seed management apparatus 130 and the ciphertext storage apparatus 140 via the predetermined communication path. The random number seed management apparatus 130 is connected to the signature apparatus 160 via the predetermined communication path. The ciphertext storage apparatus 140 is connected to the decrypting apparatus 150 via the predetermined communication path. The decrypting apparatus 150 is connected to the signature apparatus 160 and the security execution apparatus 170 via the predetermined communication path.

Note that each of the apparatuses need not be implemented in different apparatuses, and for example, the key management apparatus 110, the random number seed management apparatus 130, and the signature apparatus 160 may be implemented in the same apparatus. In addition, as with the case of NPL 2, a part of the signature apparatus 160 and the key management apparatus may be implemented in a security execution environment. When the security execution environment can be constructed in the decrypting apparatus 150 as with the memory encryption function described above, the decrypting apparatus 150 and the security execution apparatus 170 may be implemented in the same apparatus.

The key management apparatus 110 is an apparatus that generates a signature key pair including a verification key and a signature key and an encryption key pair including an encryption key and a decryption key. The key management apparatus 110 includes an encryption key pair generation section 111, a signature key pair generation section 112, an encryption key storage section 113, a decryption key storage section 114, and a verification key storage section 115.

The encrypting apparatus 120 is an apparatus that generates pseudo-random numbers different for respective pieces of data, and encrypts the generated pseudo-random numbers together with the pieces of data. The encrypting apparatus 120 includes a random number seed storage section 121, an encryption key storage section 122, a data input section 123, a user index input section 124, a data index generation section 125, a pseudo-random number generation section 126, and an encrypting section 127.

The random number seed management apparatus 130 is an apparatus that generates a random number seed for the encrypting apparatus 120 to generate the pseudo-random numbers, and delivers the generated random number seed to the encrypting apparatus 120. The random number seed management apparatus 130 includes a user index acquisition section 131, a random number seed generation section 132, and a random number seed storage section 133.

The ciphertext storage apparatus 140 includes a ciphertext storage section 141 and an index acquisition section 142.

The decrypting apparatus 150 is an apparatus that mediates transmission and reception of data between the signature apparatus 160 and the security execution apparatus 170. The decrypting apparatus 150 acquires a function program from outside, and an index pair associating an index of data input to the function program and an index of a user corresponding to the pieces of data input to the function program. The decrypting apparatus 150 transmits the acquired function program and index pair to the signature apparatus 160. The decrypting apparatus 150 acquires a signature (control information) from the signature apparatus 160, and transmits the acquired signature to the security execution apparatus 170. The decrypting apparatus 150 includes a function program input section 151, a ciphertext acquisition section 152, an index input section 153, a signature acquisition section 154, and a function value acquisition section 155.

The signature apparatus 160 regenerates (reproduces) the pseudo-random numbers used by the encrypting apparatus 120 for encryption of the respective pieces of data, and generates control information for certifying validity of the pieces of data (validity of the user being a transmission source of the data input to the function program) from the regenerated pseudo-random numbers. The signature apparatus 160 includes a signature key storage section 161, a function program acquisition section 162, a ciphertext acquisition section 163, an index acquisition section 164, a random number seed acquisition section 165, a hash value calculation section 166, a pseudo-random number generation section 167, and a signature generation section 168.

The security execution apparatus 170 is an apparatus that verifies the control information based on the pseudo-random numbers obtained by decrypting ciphertexts of the pieces of data, and calculates a function value of the pieces of data obtained by decrypting the ciphertexts when the verification of the control information is successful. The security execution apparatus 170 includes a decryption key storage section 171, a verification key storage section 172, a function program acquisition section 173, a ciphertext acquisition section 174, a signature acquisition section 175, a decrypting section 176, a hash value calculation section 177, a signature verification section 178, and a function value calculation section 179.

[Description of Operation]

Next, with reference to the drawings, operation of the entire functional encryption system according to the first example embodiment will be described in detail.

The functional encryption system 100 according to the first example embodiment executes operation related to key generation, operation related to encryption preparation, operation related to encryption, operation related to decryption preparation, and operation related to decryption.

In the operation related to key generation, the key management apparatus 110 generates a key pair (encryption key and decryption key) for public key encryption and a key pair (signature key and verification key) for a signature. The encryption key is transmitted to the encrypting apparatus 120. The signature key is transmitted to the signature apparatus 160. The decryption key and the verification key are transmitted to the security execution apparatus 170.

In the operation related to encryption preparation, the encrypting apparatus 120 receives the user index (user identifier) from outside of the system. The encrypting apparatus 120 receives the encryption key from the key management apparatus 110. In addition, the encrypting apparatus 120 receives the random number seed associated with the user index from the random number seed management apparatus 130.

In the operation related to encryption, the encrypting apparatus 120 receives pieces of data from outside of the system. The encrypting apparatus 120 generates the pseudo-random numbers from the random number seed associated with the user index and the generated data index, and encrypts the pseudo-random numbers together with the pieces of data. In this manner, the encrypting apparatus 120 generates the pseudo-random numbers different for respective pieces of data by using the random number seed delivered from the random number seed management apparatus 130. Note that the encrypting apparatus 120 may receive the data index from outside. The encrypting apparatus 120 transmits the obtained ciphertexts and the index pair (pair of the user index and the data index) to the ciphertext storage apparatus 140. The ciphertext storage apparatus 140 stores the index pair and the ciphertexts in association with each other.

In the operation related to decryption preparation, the security execution apparatus 170 receives the decryption key and the verification key from the key management apparatus 110.

In the operation related to decryption, the decrypting apparatus 150 receives a function program and a list of index pairs from outside of the system. The decrypting apparatus 150 receives ciphertexts (list of ciphertexts; list of a plurality of ciphertexts) corresponding to the list of index pairs from the ciphertext storage apparatus 140.

The decrypting apparatus 150 transmits the function program and the list of index pairs to the signature apparatus 160. The signature apparatus 160 receives a list of random number seeds corresponding to a list of user indexes included in the list of index pairs from the random number seed management apparatus 130. The signature apparatus 160 generates (creates) a list of pseudo-random numbers by using the random number seed and the list of data indexes.

The signature apparatus 160 joins respective elements of the created list of pseudo-random numbers to calculate a hash function (hash value). The signature apparatus 160 joins the hash value of the function program and each element of the list of pseudo-random numbers to generate a signature for a column obtained by joining the hash functions. In this case, the signature apparatus 160 generates the signature by using the signature key acquired from the key management apparatus 110. The signature apparatus 160 transmits the generated signature to the decrypting apparatus 150.

The decrypting apparatus 150 transmits the list of ciphertexts received from the ciphertext storage apparatus 140, the signature received from the signature apparatus 160, and the function program to the security execution apparatus 170.

The security execution apparatus 170 decrypts the ciphertexts of the pieces of data by using the decryption key, and performs verification of the control information (signature generated by the signature apparatus 160) by using the verification key. Specifically, the security execution apparatus 170 decrypts each ciphertext of the list of ciphertexts received from the decrypting apparatus 150 by using the decryption key stored in the security execution apparatus 170 itself to obtain a list of pieces of data and a list of pseudo-random numbers. The security execution apparatus 170 calculates the hash value of the function program. Subsequently, the security execution apparatus 170 verifies the signature received from the decrypting apparatus 150 by using a column and its stored verification key, the column being obtained by joining the hash value of the function program and each element of the list of pseudo-random numbers to join the hash functions.

When the verification is successful, the security execution apparatus 170 executes the function program with an input of the list of pieces of data to calculate the function value, and transmits the calculated function value to the decrypting apparatus 150.

[Operation Related to Key Generation]

Figure 4:
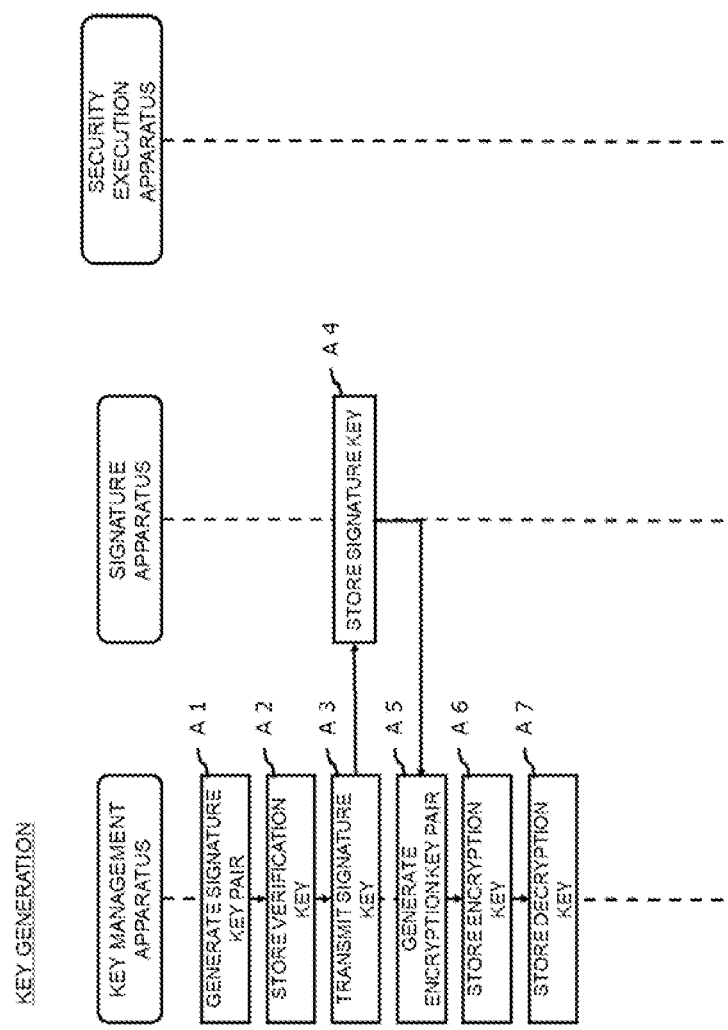
FIG. 4 is a sequence diagram illustrating an example of key generation processing executed by the functional encryption system according to the first example embodiment.

FIG. 4 is a sequence diagram illustrating an example of processing executed by the functional encryption system 100 according to the first example embodiment at the time of key generation. With reference to FIG. 4, the processing executed by the functional encryption system 100 according to the first example embodiment at the time of key generation will be described.

The signature key pair generation section 112 of the key management apparatus 110 generates a signature key pair (sk, vk) for a signature (step A1). In generation of the signature key pair, the signature key pair generation section 112 may receive security parameters and then generate the signature key pair according to the received security parameters, or may generate the signature key pair by using security parameters determined in advance.

The verification key storage section 115 of the key management apparatus 110 stores a verification key vk out of the signature key pair generated by the signature key pair generation section 112 (step A2).

The signature key pair generation section 112 transmits a signature key sk out of the generated signature key pair to the signature apparatus 160 (step A3).

The signature key storage section 161 of the signature apparatus 160 receives and stores the signature key sk (step A4).

The encryption key pair generation section 111 of the key management apparatus 110 generates an encryption key pair (ek, dk) for public key encryption (step A5). In generation of the encryption key pair, the encryption key pair generation section 111 may receive security parameters and then generate the encryption key pair according to the received security parameters, or may generate the encryption key pair by using security parameters determined in advance.

The encryption key storage section 113 of the key management apparatus 110 stores an encryption key ek out of the encryption key pair generated by the encryption key pair generation section 111 (step A6).

The decryption key storage section 114 of the key management apparatus 110 stores a decryption key dk out of the encryption key pair generated by the encryption key pair generation section 111 (step A7).

[Operation Related to Encryption Preparation]

Figure 5:
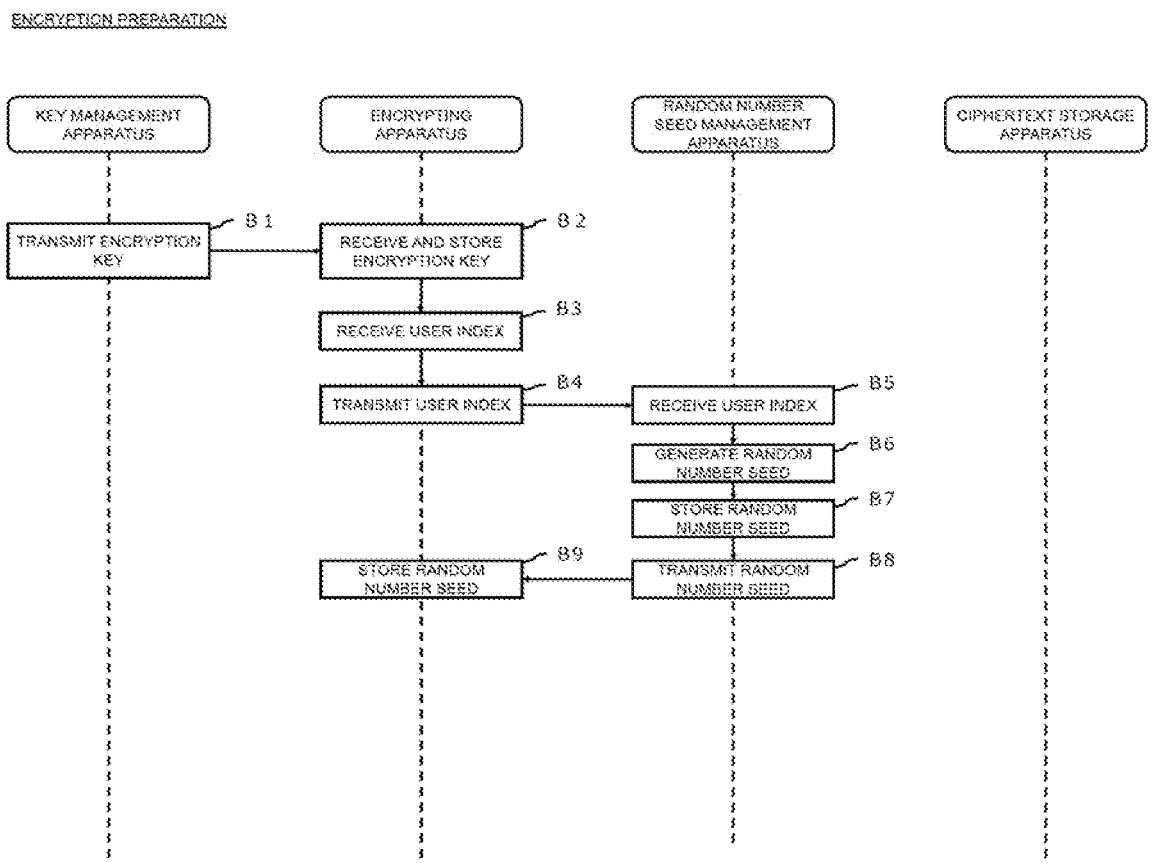
FIG. 5 is a sequence diagram illustrating an example of encryption preparation processing executed by the functional encryption system according to the first example embodiment.

FIG. 5 is a sequence diagram illustrating an example of processing executed by the functional encryption system 100 according to the first example embodiment at the time of encryption preparation. With reference to FIG. 5, the processing executed by the functional encryption system 100 according to the first example embodiment at the time of encryption preparation will be described.

The encryption key storage section 113 of the key management apparatus 110 transmits the stored encryption key ek to the encrypting apparatus 120 (step B1).

The encryption key storage section 122 of the encrypting apparatus 120 receives and stores the encryption key ek (step B2). Note that the storage of the encryption key ek may be executed during the operation related to key generation.

The user index input section 124 of the encrypting apparatus 120 receives a user index i from outside of the system (step B3).

The user index input section 124 transmits the user index i to the random number seed management apparatus 130 (step B4).

The user index acquisition section 131 of the random number seed management apparatus 130 receives the user index i (step B5).

The user index acquisition section 131 requests the random number seed generation section 132 of the random number seed management apparatus 130 to generate a random number seed. The random number seed generation section 132 generates a random number seed s_i of the user i in response to the request (step B6). The random number seed generation section 132 may generate the random number seed s_i in advance before receiving the request. Note that the random number seed is generated based on time at which the random number seed is generated or the like.

The random number seed generation section 132 transmits the random number seed s_i to the random number seed storage section 133. The random number seed storage section 133 stores the user index i and the random number seed s_i in association with each other (step B7).

The random number seed storage section 133 transmits the random number seed s_i to the encrypting apparatus 120 (step B8). Instead of the random number seed storage section 133, the random number seed generation section 132 may transmit the random number seed s_i to the encrypting apparatus 120.

The random number seed storage section 121 of the encrypting apparatus 120 stores the random number seed s_i (step B9).

[Operation Related to Encryption]

Figure 6:
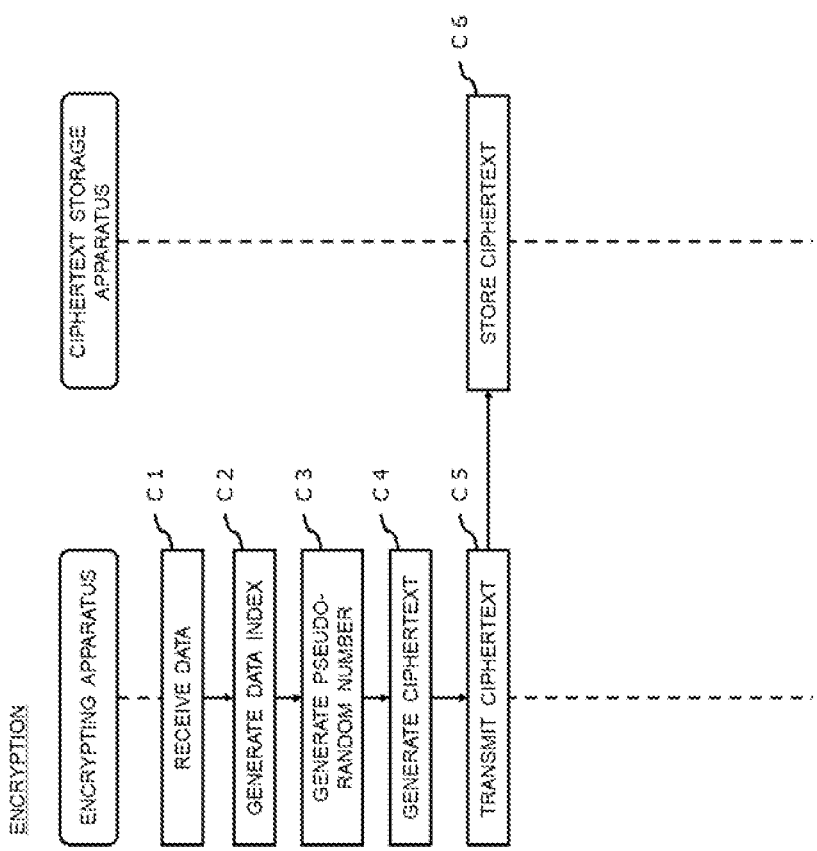
FIG. 6 is a sequence diagram illustrating an example of encryption processing executed by the functional encryption system according to the first example embodiment.

FIG. 6 is a sequence diagram illustrating an example of processing executed by the functional encryption system 100 according to the first example embodiment at the time of encryption. With reference to FIG. 6, the processing executed by the functional encryption system 100 according to the first example embodiment at the time of encryption will be described.

The encrypting apparatus 120 receives data x_(i, j) from outside of the system (step C1). j is a positive integer for identifying data (the same applies hereinafter). The data x_(i, j) indicates the j-th piece of data of the user i.

The data index generation section 125 of the encrypting apparatus 120 generates a data index j being a unique natural number (step C2). For example, the data index generation section 125 generates the data index j by sequentially incrementing from 1.

The pseudo-random number generation section 126 of the encrypting apparatus 120 calculates a pseudo-random number r_(i, j) from the random number seed s_i stored in the random number seed storage section 121 and the data index j (step C3). Specifically, the pseudo-random number generation section 126 inputs the random number seed s_i and the data index j to a pseudo-random number function PRNG to thereby calculate the pseudo-random number r_(i, j) (r_(i, j)=PRNG(s_i,j)).

The encrypting section 127 of the encrypting apparatus 120 joins the data x_(i, j) received by the data input section 123 and the pseudo-random number r_(i, j) generated by the pseudo-random number generation section 126 to generate a joined column x_(i, j)||r_(i, j). Note that || is an operator indicating joining. The encrypting section 127 encrypts the joined column obtained through the joining by using the encryption key ek, to thereby generate ciphertext ct_(i, j)=Enc(ek, x_(i, j)∥r_(i, j)) (step C4). Note that "Enc" indicates ciphertext generation processing.

The encrypting section 127 transmits the ciphertext ct_(i, j) and the index pair (i, j) used for ciphertext generation to the ciphertext storage apparatus 140 (step C5).

The ciphertext storage section 141 of the ciphertext storage apparatus 140 stores the received ciphertext ct_(i, j) and index pair (i, j) in association with each other (step C6).

[Operation Related to Decryption Preparation]

Figure 7:
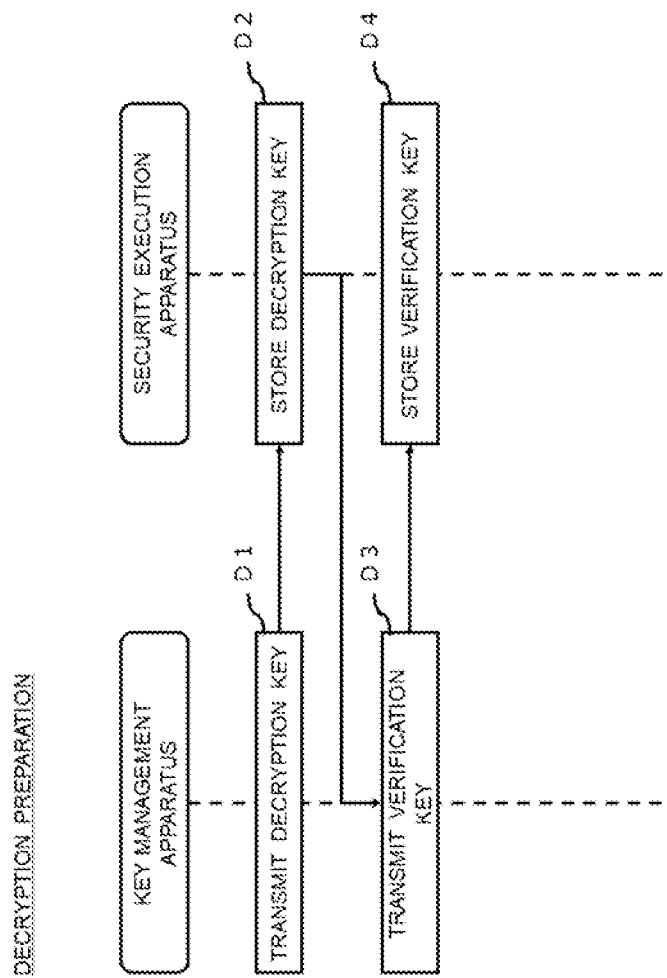
FIG. 7 is a sequence diagram illustrating an example of decryption preparation processing executed by the functional encryption system according to the first example embodiment.

FIG. 7 is a sequence diagram illustrating an example of processing executed by the functional encryption system 100 according to the first example embodiment at the time of decryption preparation. With reference to FIG. 7, the processing executed by the functional encryption system 100 according to the first example embodiment at the time of decryption preparation will be described.

The decryption key storage section 114 of the key management apparatus 110 transmits the decryption key dk to the security execution apparatus 170 (step D1).

The decryption key storage section 171 of the security execution apparatus 170 stores the decryption key dk (step D2).

The verification key storage section 115 of the key management apparatus 110 transmits the decryption key vk to the security execution apparatus 170 (step D3).

The verification key storage section 172 of the security execution apparatus 170 stores the decryption key vk (step D4).

[Operation Related to Decryption]

Figure 8:
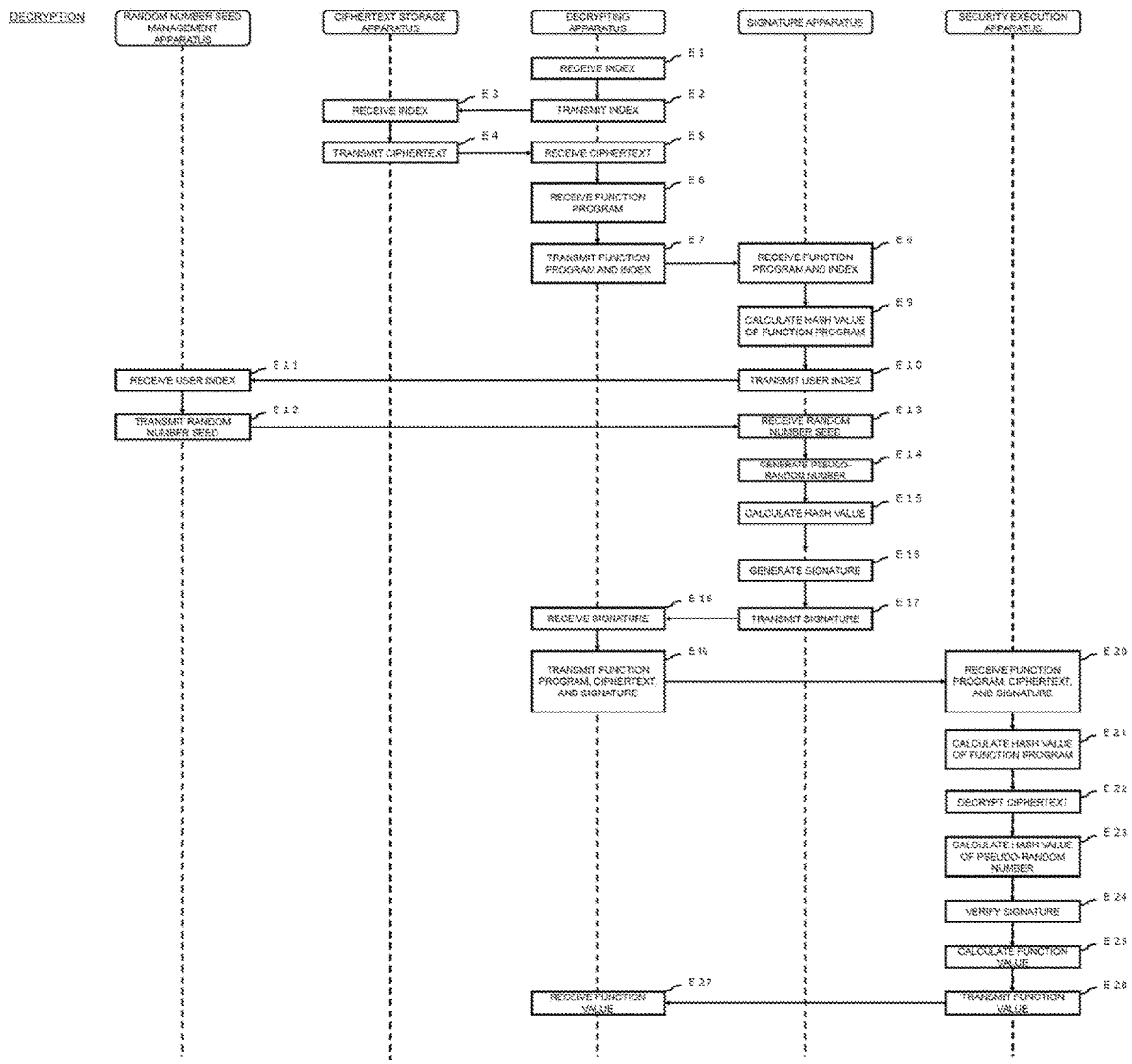
FIG. 8 is a sequence diagram illustrating an example of decryption processing executed by the functional encryption system according to the first example embodiment.

FIG. 8 is a sequence diagram illustrating an example of processing executed by the functional encryption system 100 according to the first example embodiment at the time of decryption. With reference to FIG. 8, the processing executed by the functional encryption system 100 according to the first example embodiment at the time of decryption will be described.

The index input section 153 of the decrypting apparatus 150 receives a list $l\_p=((i_1, j_1), (i_2, j_2), \ldots, (i_k, j_k))$ of index pairs from outside of the system (step E1). $i_1, i_2, \ldots, i_k$ is included in a user index space. Moreover, $j_1, j_2, \ldots, j_k$ is included in a data index space. k is a suffix for distinguishing the user i and the data j.

The index input section 153 transmits the list l_p of indexes to the ciphertext storage apparatus 140 (step E2).

The index acquisition section 142 of the ciphertext storage apparatus 140 receives the index pair l_p (step E3).

The index acquisition section 142 extracts a list $l\_ct=(c\_(i_1, j_1), c\_(i_2, j_2), \ldots, c\_(i_k, j_k))$ of ciphertexts corresponding to the index pair l_p from the ciphertext storage section 141, and transmits the list l_ct to the decrypting apparatus 150 (step E4).

The ciphertext acquisition section 152 of the decrypting apparatus 150 receives the list l_ct of ciphertexts (step E5).

The function program input section 151 of the decrypting apparatus 150 receives a function program P from outside of the system (step E6).

The function program input section 151 transmits the function program P to the signature apparatus 160, and the index input section 153 transmits the list l_p of index pairs to the signature apparatus 160 (step E7).

The function program acquisition section 162 of the signature apparatus 160 receives the function program P in which a function f is implemented, and the index acquisition section 164 of the signature apparatus 160 receives the list l_p of index pairs (step E8).

The function program acquisition section 162 transmits the function program P to the hash value calculation section 166. The hash value calculation section 166 calculates a hash value h=H(P) of the function program P (step E9).

The index acquisition section 164 transmits a list $l\_u=(i_1, i_2, \ldots, i_k)$ of user indexes to the random number seed management apparatus 130 (step E10).

The user index acquisition section 131 of the random number seed management apparatus 130 receives the list l_u of user indexes (step E11).

The random number seed storage section 133 transmits a list $l\_s=(s\_(i_1), s\_(i_2), \ldots, s\_(i_k))$ of random number seeds corresponding to the list l_u of user indexes to the signature apparatus 160 (step E12).

The random number seed acquisition section 165 of the signature apparatus 160 receives the list l_s of random number seeds (step E13).

The pseudo-random number generation section 167 of the signature apparatus 160 calculates a list l_r of pseudo-random numbers from the list l_s of random number seeds and a list $l\_d=(j_1, j_2, \ldots, j_k)$ of data indexes (step E14). The list is calculated as follows.

$$l\_r=(r\_(i_1,j_1), r\_(i_2,j_2), \ldots, r\_(i_k,j_k))=(PRNG(s\_(i_1), j_1), PRNG(s\_(i_2),j_2), \ldots, PRNG(s\_(i_k),j_k))$$

The hash value calculation section 166 joins respective elements of the list l_r of pseudo-random numbers. The joining of respective elements of the list l_r is expressed as follows.

$$r\_(i_1,j_1)\|\ldots\|r(i_k,j_k)$$

The hash value calculation section 166 calculates a hash value g of the joining of respective elements of the list l_r (step E15). The hash value g is expressed as follows.

$$\text{Hash value } g=G(r\_(i_1,j_1)\|r\_(i_2,j_2)\|\ldots\|r\_(i_k,i_k))$$

Here, the hash function G and the hash function H may be either the same or different from each other.

The signature generation section 168 generates a signature σ=Sign(sk, h∥g) for a joined column h∥g of the hash value h of the function program P and the hash value g by using the signature key sk (step E16).

The signature generation section 168 transmits the signature σ to the decrypting apparatus 150 (step E17).

The signature acquisition section 154 of the decrypting apparatus 150 receives the signature σ (step E18).

The function program input section 151, the ciphertext acquisition section 152, and the signature acquisition section 154 of the decrypting apparatus 150 transmit the function program P, the ciphertext list l_ct, and the signature σ to the security execution apparatus 170, respectively (step E19).

The function program acquisition section 173, the ciphertext acquisition section 174, and the signature acquisition section 175 of the security execution apparatus 170 receive the function program P, the ciphertext list l_ct, and the signature σ, respectively (step E20).

The hash value calculation section 177 of the security execution apparatus 170 calculates the hash value h=H(P) of the function program P (step E21).

The decrypting section 176 of the security execution apparatus 170 decrypts each element of the list l_ct of encryption to obtain $(x\_(i_1, j_1)\|r\_(i_1, j_1), x\_(i_2, j_2)\|r\_(i_2, j_2), \ldots, x\_(i_k, j_k)\|r\_(i_k, j_k))$ (step E22).

The hash value calculation section 177 of the security execution apparatus 170 separates respective elements of $(x\_(i_1, j_1)\|r\_(i_1, j_1), x\_(i_2, j_2)\|r\_(i_2, j_2), \ldots, x\_(i_k, j_k)\|r\_(i_k, j_k))$ obtained through decryption into pieces of data and pseudo-random numbers. The hash value calculation section 177 calculates the hash value g of $r\_(i_1, j_1)\|r\_(i_2, j_2)\|\ldots$ $\|r\_(i_k, j_k)$ that is obtained by joining respective elements of the list 1_r of pseudo-random numbers obtained by the separation (step E23). The hash value g is expressed as follows.

$$\text{Hash value } g = G(r\_(i_1, j_1) \| r\_(i_2, j_2) \| \ldots \| r\_(i_k, j_k))$$

The signature verification section 178 of the security execution apparatus 170 verifies the signature σ by using the verification key vk, the hash value h of the function program, and the hash value g of the value obtained by joining respective elements of the list of pseudo-random numbers (step E24).

When the verification is successful in step E25, the function value calculation section 179 of the security execution apparatus 170 executes the function program P with an input of a list 1_x of pieces of data obtained through decryption, to calculate a function value of the function f with an input of the list 1_x (step E25). The function value is expressed as follows.

$$\text{Function value} = f(x\_(i_1, j_1), x\_(i_2, j_2), \ldots, x\_(i_k, j_k))$$

The function value calculation section 179 transmits the function value $f(x\_(i_1, j_1), x\_(i_2, j_2), \ldots, x\_(i_k, j_k))$ to the decrypting apparatus 150 (step E26).

The function value acquisition section 155 of the decrypting apparatus 150 receives the function value $f(x\_(i_1, j_1), x\_(i_2, j_2), x\_(i_k, j_k))$ (step E27).

Description of Effects

The effects according to the example embodiment are that a communication cost from the key issuing system to the user can be suppressed low, and at the same time, input control to the function in the unit of data is enabled. The reason thereof is because of provision of the following configuration. Specifically, the random number seed management apparatus 130 transmits a random number seed to the encrypting apparatus 120 and the signature apparatus 160. The encrypting apparatus 120 generates pseudo-random numbers different for respective pieces of data from the random number seed and data indexes, and encrypts the pseudo-random numbers together with the pieces of data. The signature apparatus 160 regenerates the pseudo-random numbers different for the respective pieces of data that are encrypted by the encrypting apparatus 120 together with the pieces of data by using the random number seed managed by the random number seed management apparatus 130, and generates a signature based on the regenerated pseudo-random numbers and a function program. The security execution apparatus 170 decrypts acquired ciphertexts to thereby obtain the pieces of data and the pseudo-random numbers different for the respective pieces of data, and verifies the signature, based on the pseudo-random numbers and the function program. If the verification of the signature is not successful, the security execution apparatus 170 cannot input to the function the pieces of data of the ciphertexts not including the pseudo-random numbers used by the signature apparatus 160 for signature generation.

As described above, in the encryption system according to the first example embodiment, the user themselves generates random numbers different for respective pieces of data used at the time of encryption, based on the random number seed. Therefore, it suffices that one random number seed be transmitted from the key issuing system to the user. As a result, a communication cost from the key issuing system to each user is limited to the one random number seed without depending on the number of pieces of data for the user registered with the database, and a communication cost from the key issuing system to each user can thereby be reduced low.

Figure 9:
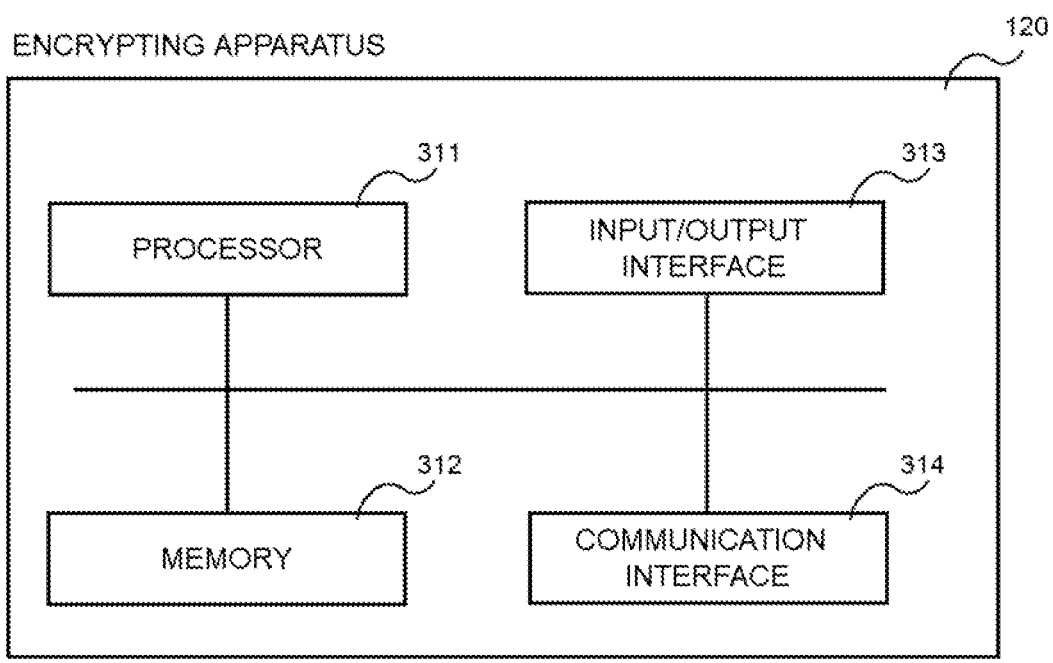
FIG. 9 is a diagram illustrating an example of a hardware configuration of an encrypting apparatus.

Next, hardware of each apparatus constituting the functional encryption system will be described. FIG. 9 is a diagram illustrating an example of a hardware configuration of the encrypting apparatus 120.

The encrypting apparatus 120 can be configured with an information processing apparatus (so-called, a computer), and includes a configuration illustrated in FIG. 9. For example, the encrypting apparatus 120 includes a processor 311, a memory 312, an input/output interface 313, a communication interface 314, and the like. Constituent elements such as the processor 311 are connected to each other with an internal bus or the like, and are configured to be capable of communicating with each other.

Note that the configuration illustrated in FIG. 9 is not to limit the hardware configuration of the encrypting apparatus 120. The encrypting apparatus 120 may include hardware not illustrated, or need not include the input/output interface 313 as necessary. The number of processors 311 and the like included in the encrypting apparatus 120 is not to be limited to the example illustrated in FIG. 9, and for example, a plurality of processors 311 may be included in the encrypting apparatus 120.

The processor 311 is, for example, a programmable device such as a central processing unit (CPU), a micro processing unit (MPU), and a digital signal processor (DSP). Alternatively, the processor 311 may be a device such as a field programmable gate array (FPGA) and an application specific integrated circuit (ASIC). The processor 311 executes various programs including an operating system (OS).

The memory 312 is a random access memory (RAM), a read only memory (ROM), a hard disk drive (HDD), a solid state drive (SSD), or the like. The memory 312 stores an OS program, an application program, and various pieces of data.

The input/output interface 313 is an interface of a display apparatus and an input apparatus (not illustrated). The display apparatus is, for example, a liquid crystal display or the like. The input apparatus is, for example, an apparatus that receives user operation, such as a keyboard and a mouse.

The communication interface 314 is a circuit, a module, or the like that performs communication with another apparatus. For example, the communication interface 314 includes a network interface card (NIC) or the like.

The function of the encrypting apparatus 120 is implemented by various processing modules. Each of the processing modules is, for example, implemented by the processor 311 executing a program stored in the memory 312. The program can be recorded on a computer readable storage medium. The storage medium can be a non-transitory storage medium, such as a semiconductor memory, a hard disk, a magnetic recording medium, and an optical recording medium. In other words, the present invention can also be implemented as a computer program product. The program can be updated through downloading via a network, or by using a storage medium storing a program. In addition, the processing module may be implemented by a semiconductor chip.

Note that the random number seed management apparatus 130 and the like can also be configured by an information processing apparatus as with the case of the encrypting apparatus 120, and a basic hardware configuration thereof is not different from that of the encrypting apparatus 120, and thus description thereof is omitted.

Example Alterations

The configuration, the operation, and the like of the functional encryption system 100 described in the example embodiment are merely examples, and are not to limit the configuration and the like of the system. For example, the ciphertext storage apparatus 140 may not be provided, and the encrypting apparatus 120 and the decrypting apparatus 150 may directly transmit and receive encrypted pieces of data.

In the plurality of sequence diagrams used in the description above, a plurality of processes (processing) are described in order; however, the order of execution of the processes executed in the example embodiment is not limited to the described order. In the example embodiment, the illustrated order of processes can be changed as far as there is no problem with regard to processing contents, such as a change in which respective processes are executed in parallel, for example.

The whole or part of the example embodiments disclosed above can be described as in the following supplementary notes, but are not limited to the following.

(Supplementary Note 1)

An encryption system including:
- an encrypting apparatus (10, 120) configured to generate pseudo-random numbers different for respective pieces of data, and encrypt the generated pseudo-random numbers together with the respective pieces of the data;
- a signature apparatus (20, 160) configured to regenerate pseudo-random numbers used by the encrypting apparatus (10, 120) for encrypting the respective pieces of the data, and generate control information for certifying validity of the respective pieces of the data from the regenerated pseudo-random numbers; and
- a security execution apparatus (30, 170) configured to verify the control information based on the pseudo-random numbers obtained by decrypting ciphertexts of the respective pieces of the data, and calculate a function value of data obtained by decrypting the ciphertexts when the verification of the control information is successful.

(Supplementary Note 2)

The encryption system according to supplementary note 1, wherein
- the signature apparatus (20, 160) is configured to calculate a signature based on a function program for obtaining the function value of the data and the regenerated pseudo-random numbers, and handle the calculated signature as the control information, and
- the security execution apparatus (30, 170) is configured to verify the calculated signature.

(Supplementary Note 3)

The encryption system according to supplementary note 2, further including
- a random number seed management apparatus (130) configured to generate a random number seed for the encrypting apparatus (10, 120) to generate the pseudo-random numbers, and deliver the generated random number seed to the encrypting apparatus (10, 120), wherein
- the encrypting apparatus (10, 120) is configured to generate the pseudo-random numbers different for the respective pieces of the data by using the delivered random number seed.

(Supplementary Note 4)

The encryption system according to supplementary note 3, further including
- a key management apparatus (110) configured to generate a signature key pair including a verification key and a signature key, and an encryption key pair including an encryption key and a decryption key, wherein
- the key management apparatus (110) is configured to transmit the signature key to the signature apparatus (20, 160), and transmit the decryption key and the verification key to the security execution apparatus (30, 170).

(Supplementary Note 5)

The encryption system according to supplementary note 4, wherein
- the signature apparatus (20, 160) is configured to generate the control information by using the signature key.

(Supplementary Note 6)

The encryption system according to supplementary note 4 or 5, wherein
- the security execution apparatus (30, 170) is configured to decrypt the ciphertexts of the respective pieces of the data by using the decryption key, and perform the verification of the control information by using the verification key.

(Supplementary Note 7)

The encryption system according to supplementary note 6, further including
- a decrypting apparatus (150) configured to acquire the function program from outside, and an index pair associating an index of data input to the function program and an index of a user corresponding to the data input to the function program, and transmit the acquired function program and index pair to the signature apparatus (20, 160), wherein
- the signature apparatus (20, 160) is configured to acquire the random number seed for regenerating the pseudo-random numbers based on the index pair from the random number seed management apparatus (130), calculate the signature based on the acquired function program and random number seed, and transmit the calculated signature to the decrypting apparatus (150), and
- the decrypting apparatus (150) is configured to transmit the received signature to the security execution apparatus (30, 170).

(Supplementary Note 8)

The encryption system according to any one of supplementary notes 1 to 7, wherein
- the security execution apparatus (30, 170) is configured to calculate the function value by using a hardware-assisted memory encryption function.

(Supplementary Note 9)

The encryption system according to any one of supplementary notes 1 to 8, wherein
- the security execution apparatus (30, 170) is configured to execute functional encryption.

(Supplementary Note 10)

The encryption system according to any one of supplementary notes 1 to 9, wherein
- the signature apparatus (20, 160) is configured to generate an Elliptic Curve Digital Signature Algorithm (ECDSA) signature.

(Supplementary Note 11)

A function value calculation method including:
- generating pseudo-random numbers different for respective pieces of data, and encrypting the generated pseudo-random numbers together with the respective pieces of the data;

regenerating pseudo-random numbers used by the encrypting apparatus for encrypting the respective pieces of the data, and generating control information for certifying validity of the respective pieces of the data from the regenerated pseudo-random numbers; and verifying the control information based on the pseudo-random numbers obtained by decrypting ciphertexts of the respective pieces of the data, and calculating a function value of the pieces of the data obtained by decrypting the ciphertexts when the verification of the control information is successful.

(Supplementary Note 12)

A program for causing a computer (311) to execute:

generating pseudo-random numbers different for respective pieces of data, and encrypting the generated pseudo-random numbers together with the respective pieces of the data;

regenerating pseudo-random numbers used by the encrypting apparatus for encrypting the respective pieces of the data, and generating control information for certifying validity of the respective pieces of the data from the regenerated pseudo-random numbers; and verifying the control information based on the pseudo-random numbers obtained by decrypting ciphertexts of the respective pieces of the data, and calculating a function value of the pieces of the data obtained by decrypting the ciphertexts when the verification of the control information is successful.

Each of the configurations of supplementary notes 11 and 12 can be developed into any one of the configurations of supplementary notes 2 to 10 in the same way as in the case of supplementary note 1.

Note that the disclosure of each of the cited literatures in Citation List described above is incorporated herein by reference. Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

REFERENCE SIGNS LIST 10, 120 Encrypting Apparatus
20, 160 Signature Apparatus
30, 170 Security Execution Apparatus
100 Functional Encryption System
110 Key Management Apparatus
111 Encryption Key Pair Generation Section
112 Signature Key Pair Generation Section
113 Encryption Key Storage Section
114 Decryption Key Storage Section
115 Verification Key Storage Section
121 Random Number Seed Storage Section
122 Encryption Key Storage Section
123 Data Input Section
124 User Index Input Section
125 Data Index Generation Section
126 Pseudo-Random Number Generation Section
127 Encrypting Section
130 Random Number Seed Management Apparatus
131 User Index Acquisition Section
132 Random Number Seed Generation Section
133 Random Number Seed Storage Section
140 Ciphertext Storage Apparatus
141 Ciphertext Storage Section
142 Index Acquisition Section
150 Decrypting Apparatus
151 Function Program Input Section
152 Ciphertext Acquisition Section
153 Index Input Section
154 Signature Acquisition Section
155 Function Value Acquisition Section
161 Signature Key Storage Section
162 Function Program Acquisition Section
163 Ciphertext Acquisition Section
164 Index Acquisition Section
165 Random Number Seed Acquisition Section
166 Hash Value Calculation Section
167 Pseudo-Random Number Generation Section
168 Signature Generation Section
171 Decryption Key Storage Section
172 Verification Key Storage Section
173 Function Program Acquisition Section
174 Ciphertext Acquisition Section
175 Signature Acquisition Section
176 Decrypting Section
177 Hash Value Calculation Section
178 Signature Verification Section
179 Function Value Calculation Section
311 Processor
312 Memory
313 Input/Output Interface
314 Communication Interface

What is claimed is:

1. An encryption system comprising:

an encrypting apparatus comprising a memory storing instructions, and one or more processors configured to execute the instructions to generate pseudo-random numbers for respective pieces of data and that are different from one another, and encrypt the generated pseudo-random numbers together with the respective pieces of the data;

a random number seed management apparatus comprising a memory storing instructions, and one or more processors configured to execute the instructions to generate a random number seed for the encrypting apparatus to generate the pseudo-random numbers, and deliver the generated random number seed to the encrypting apparatus;

a signature apparatus comprising a memory storing instructions, and one or more processors configured to execute the instructions to regenerate the pseudo-random numbers used by the encrypting apparatus for encrypting the respective pieces of the data, and generate control information for certifying validity of the respective pieces of the data from the regenerated pseudo-random numbers;

a security execution apparatus comprising a memory storing instructions, and one or more processors configured to execute the instructions to verify the control information based on the pseudo-random numbers obtained by decrypting ciphertexts of the respective pieces of the data, and calculate a function value of data obtained by decrypting the ciphertexts when verification of the control information is successful; and a decrypting apparatus comprising a memory storing instructions, and one or more processors configured to execute the instructions to acquire a function program for obtaining the function value of the data from outside, and an index pair associating an index of data input to the function program and an index of a user corresponding to data input to the function program, and transmit the function program and an index pair to the signature apparatus, wherein the one or more processors of the encrypting apparatus are configured to generate the pseudo-random numbers for the respective pieces of the data by using the delivered random number seed, the one or more processors of the signature apparatus are configured to acquire the random number seed for regenerating the pseudo-random numbers based on the index pair from the random number seed management apparatus, calculate a signature based on the function program and the random number seed, and transmit the signature as the control information to the decrypting apparatus, the one or more processors of the decrypting apparatus are configured to transmit the signature to the security execution apparatus, and the one or more processors of the security execution apparatus are configured to verify the signature.

2. The encryption system according to claim 1, further comprising a key management apparatus comprising a memory storing instructions, and one or more processors configured to execute the instructions to generate a signature key pair including a verification key and a signature key, and an encryption key pair including an encryption key and a decryption key, wherein the one or more processors of the key management apparatus are configured to transmit the signature key to the signature apparatus, and transmit the decryption key and the verification key to the security execution apparatus.

3. The encryption system according to claim 2, wherein the one or more processors of the signature apparatus are configured to generate the control information by using the signature key.

4. The encryption system according to claim 2, wherein the one or more processors of the security execution apparatus are configured to decrypt the ciphertexts of the respective pieces of the data by using the decryption key, and perform the verification of the control information by using the verification key.

5. The encryption system according to claim 1, wherein the one or more processors of the security execution apparatus are configured to calculate the function value by using a hardware-assisted memory encryption function.

6. The encryption system according to claim 1, wherein the one or more processors of the security execution apparatus are configured to execute functional encryption.

7. The encryption system according to claim 1, wherein the one or more processors of the signature apparatus are configured to generate an Elliptic Curve Digital Signature Algorithm (ECDSA) signature.

8. A function value calculation method comprising:

generating, by an encrypting apparatus, pseudo-random numbers for respective pieces of data that are different from one another, and encrypting the generated pseudo-random numbers together with the respective pieces of the data;

generating, by a random number seed management apparatus, a random number seed for the encrypting apparatus to generate the pseudo-random numbers, and delivering the generated random number seed to the encrypting apparatus;

regenerating, by a signature apparatus, the pseudo-random numbers used by the encrypting apparatus for encrypting the respective pieces of the data, and generating control information for certifying validity of the respective pieces of the data from the regenerated pseudo-random numbers;

verifying, by a security execution apparatus, the control information based on the pseudo-random numbers obtained by decrypting ciphertexts of the respective pieces of the data, and calculating a function value of data obtained by decrypting the ciphertexts when verification of the control information is successful; and acquiring, by a decrypting apparatus, a function program for obtaining the function value of the data from outside, and an index pair associating an index of data input to the function program and an index of a user corresponding to data input to the function program, and transmitting the function program and an index pair to the signature apparatus, wherein the function value calculation method further comprises:

generating, by the encrypting apparatus, the pseudo-random numbers for the respective pieces of the data by using the delivered random number seed;

acquiring, by the signature apparatus, the random number seed for regenerating the pseudo-random numbers based on the index pair from the random number seed management apparatus, calculating a signature based on the function program and the random number seed, and transmitting the signature as the control information to the decrypting apparatus;

transmitting, by the decrypting apparatus, the signature to the security execution apparatus; and verifying, by the security execution apparatus, the signature.

9. A non-transitory computer readable recording medium storing a program for causing one or more processors to execute:

generating, by an encrypting apparatus, pseudo-random numbers for respective pieces of data that are different from one another, and encrypting the generated pseudo-random numbers together with the respective pieces of the data;

generating, by a random number seed management apparatus, a random number seed for the encrypting apparatus to generate the pseudo-random numbers, and delivering the generated random number seed to the encrypting apparatus;

regenerating, by a signature apparatus, the pseudo-random numbers used by the encrypting apparatus for encrypting the respective pieces of the data, and generating control information for certifying validity of the respective pieces of the data from the regenerated pseudo-random numbers;

verifying, by a security execution apparatus, the control information based on the pseudo-random numbers obtained by decrypting ciphertexts of the respective pieces of the data, and calculating a function value of data obtained by decrypting the ciphertexts when verification of the control information is successful; and acquiring, by a decrypting apparatus, a function program for obtaining the function value of the data from outside, and an index pair associating an index of data input to the function program and an index of a user corresponding to data input to the function program, and transmitting the function program and an index pair to the signature apparatus, wherein the program is further for causing the one or more processors to execute:

generating, by the encrypting apparatus, the pseudo-random numbers for the respective pieces of the data by using the delivered random number seed;

acquiring, by the signature apparatus, the random number seed for regenerating the pseudo-random numbers based on the index pair from the random number seed management apparatus, calculating a signature based on the function program and the random number seed, and transmitting the signature as the control information to the decrypting apparatus;

transmitting, by the decrypting apparatus, the signature to the security execution apparatus; and verifying, by the security execution apparatus, the signature.

* * * * *